June 21, 1955   J. H. APEL   2,711,257
PORTABLE SHOVEL LOADER
Filed March 14, 1952   4 Sheets-Sheet 1

INVENTOR.
John H. Apel
BY
Attorneys

June 21, 1955 J. H. APEL 2,711,257
PORTABLE SHOVEL LOADER
Filed March 14, 1952 4 Sheets-Sheet 4

INVENTOR.
John H. Apel.
BY
Attorneys

United States Patent Office 2,711,257
Patented June 21, 1955

2,711,257
PORTABLE SHOVEL LOADER

John H. Apel, Columbus, Ohio, assignor to The Jaeger Machine Company, Columbus, Ohio, a corporation of Ohio Application March 14, 1952, Serial No. 276,642

1 Claim. (Cl. 214—140)

My invention relates to a portable shovel loader. It has to do, more specifically, with a loader which is in the form of a tractor that carries boom arms which extend forwardly thereof and which carry a scoop or shovel, the boom arms being vertically swingable on the tractor and the scoop being pivoted to the outer ends of the boom arms so that it may be tilted properly relative thereto for scooping up material and for dumping material therefrom.

In a loader of this type, the material is scooped up from the surface by having the boom arms in their lowermost position and moving the entire tractor forwardly so that the scoop will enter the material. At this time, the scoop must have its open side directed forwardly. However, as soon as the scoop is full, it is desirable to swing the boom arms upwardly and simultaneously tilt the scoop rearwardly to prevent spillage of material therefrom. During the upward swing of the boom arms, the scoop must be kept in a proper tilted position relative to the arms to prevent the material from spilling therefrom. Finally, it is desirable that the scoop be tilted forwardly relative to the boom arms to dump the material therefrom, this preferably being accomplished while the boom arms are at an elevated position.

It is the main object of my invention to provide a portable loader of the type indicated above with novel linkage means to automatically control the position of the scoop as the boom arms swing vertically, the linkage means also including means for positively controlling the position of the scoop relative to the arms to facilitate digging or dumping.

The loader in which my invention is embodied includes a tractor of any suitable type consisting of a rugged frame carried on any desired type of traction means. However, it is desirable that the tractor be small and compact and that the traction be small and compact and that the traction means be such that the tractor can turn in a short radius and, therefore, the loader can be used in a limited space. Boom arms are provided at each side of the tractor and have their rear ends pivoted to the tractor frame preferably at a relatively high level and adjacent the rear end of the frame. The boom arms extend forwardly of the tractor and have a scoop pivoted to their forward ends for tilting vertically relative to the arms, this scoop having one side open. The arms are preferably of such length that the scoop in its vertical movement travels as close as possible to the forward end of the tractor. The boom arms are preferably swung vertically by means of a pair of hydraulic rams connected between the tractor frame and the arms close to their pivot points. The scoop is automatically tilted relative to the boom arms, as such arms swing vertically, by means of novel linkage, which I have devised, adjacent each boom arm. This linkage includes rams which can be actuated to positively position the scoop on the arms for digging or dumping.

The preferred embodiment of my invention is illustrated in the accompanying drawings wherein similar characters of reference designate corresponding parts and wherein.

Figure 1:
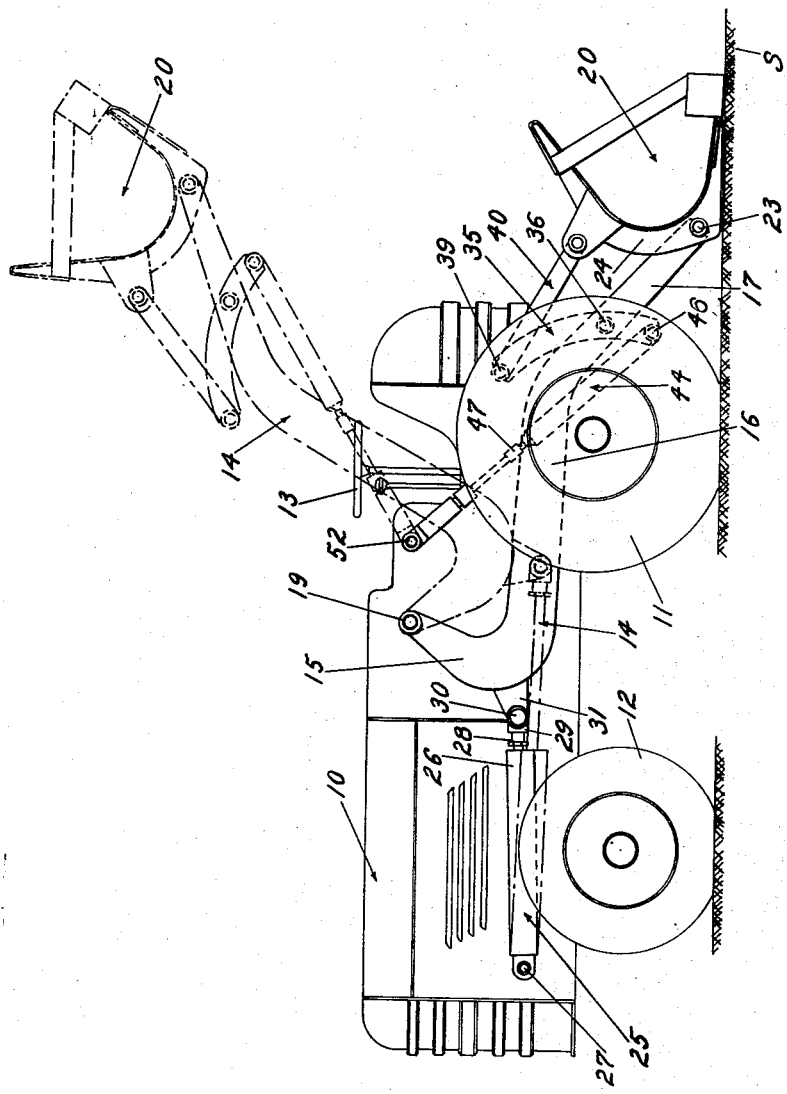
Figure 1 is a side elevational view of a tractor loader constructed according to my invention, the boom and scoop being shown in lower digging position by full lines and in raised dumping position by broken lines.

With reference to the drawings, I have illustrated in Figure 1 a tractor 10 of any suitable type. The tractor is supported by traction means which preferably include a pair of large front wheels 11 and a pair of smaller rear wheels 12. It is preferred that the rear wheels 12 be steerable by means of a steering wheel 13 which is connected to the wheels 12 in any suitable manner (not shown). It is also preferred that the engine and related units of the tractor be at the rear end of the tractor over the wheels 12 so as to counterbalance the loading mechanism which will be at the forward end of the tractor.

Figure 2:
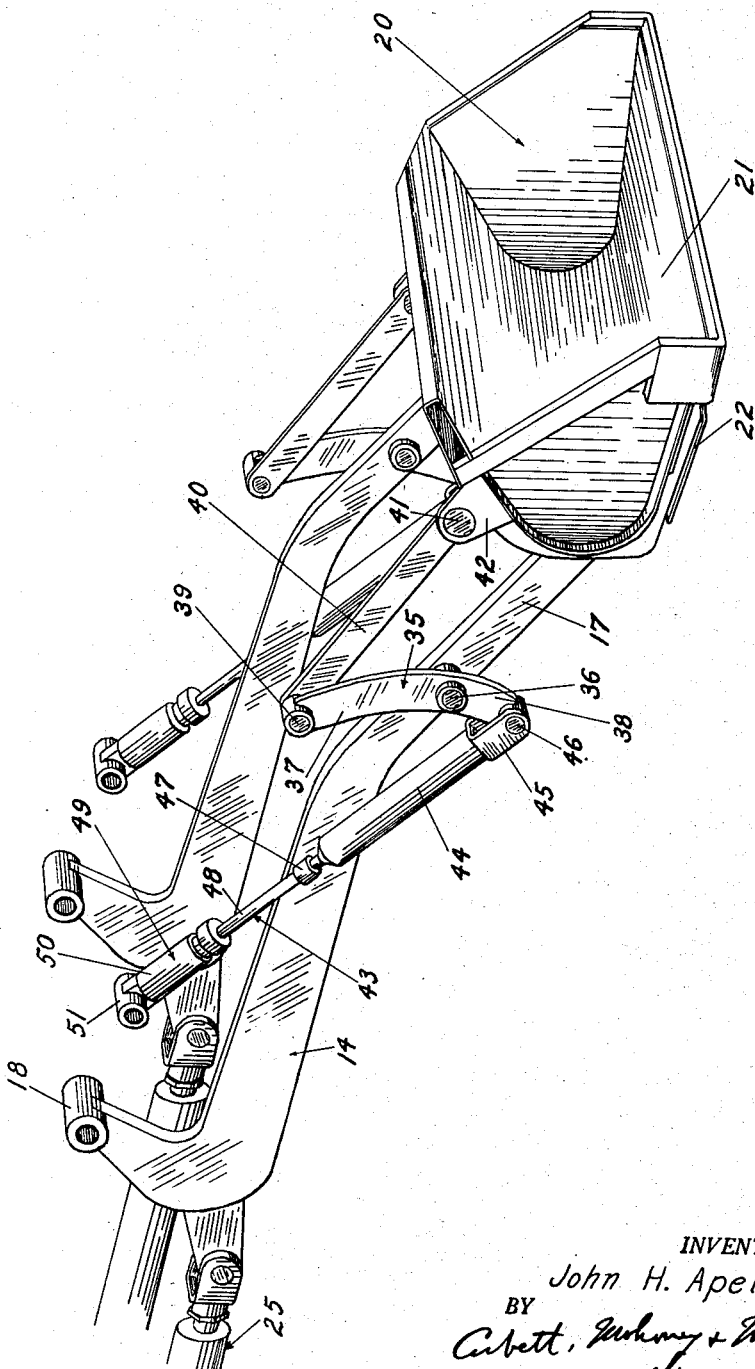
Figure 2 is a perspective view of the boom arms, scoop and linkage showing the detailed structure thereof.

The loading mechanism disposed at the forward end of the tractor 10 is shown in Figures 1 and 2 and comprises a boom formed by a pair of boom arms 14. One of these arms is disposed at each side of the tractor and extends forwardly thereof. Each boom arm 14 is provided with an upstanding rear section 15, which is substantially vertical when the boom arm is in its lowermost position as shown in full lines in Figure 1, a substantially horizontally disposed section 16, and a downwardly and forwardly inclined section 17, the section 17 extending beyond the forward end of the tractor 10. The upstanding section 15 is provided at its upper end with a transverse pivot sleeve 18 which is pivoted by a pivot pin 19 to the side of the frame of the tractor adjacent the top thereof and rearwardly a substantial distance from the axles of the wheels 11.

A scoop 20, as shown in Figures 1 and 2, is pivoted to the forward and lower ends of the sections 17 of the arms 14. The scoop 20 may take various forms but has one side open, this open side being directed forwardly when the boom arms 14 are in their lowermost positions, as shown in Figure 1 in full lines. In this position, the scoop has its lower wall 21 parallel with the surface S, the scoop being provided with shoe portions 22 at its sides which engage the surface. The rear side of the scoop is pivoted to the arm sections 17 by means of a transverse pivot rod 23 which extends through openings in both arm sections 17 and through aligning openings in the ribs 24 provided at the rear and upper walls of the scoop 20. It will be apparent that as the arms 14 are swung vertically, the scoop 20 will be raised and lowered adjacent the front end of the tractor 10. The wheels 11 are disposed closely adjacent the front end of the tractor, to aid in preventing forward tilting of the tractor, and the arms 14 are of such length that the scoop 20 in its vertical movement will travel close to the wheels 11 and to the front end of the tractor.

The boom arms 14 are swung vertically by means of a pair of rams 25. One of these rams is provided at each side of the tractor 10 and is substantially horizontally disposed. The cylinder 26 of each ram is pivoted to the tractor frame by a pivot 27 located adjacent the rear and lower corner of the tractor frame behind the axle of the wheel 12. The piston rod 28 of the ram extends forwardly from the cylinder and carries a clevis 29 which is pivoted at 30 to a rearwardly projecting bracket 31 which is formed on the boom arm 14. It will be noted that this bracket 31 is directly opposite the angle between the upstanding section 15 and the forwardly extending section 16 of the boom arm. Suitable valve controls (not shown) will be provided in the usual manner for controlling the rams 25 simultaneously to supply fluid thereto so as to move the piston rods 28 outwardly to swing the boom arms 14 upwardly. The valves can also be controlled to exhaust the fluid to permit the arms 14 to swing downwardly. Preferably the rams are hydraulically operated.

With the scoop 20 in the full line position indicated in Figure 1, the tractor 10 can be moved forwardly to scoop up material from the surface S. However, as soon as the scoop 20 is loaded and the scoop is started in its vertical movement by moving the arms 14 upwardly under the control of rams 25, it is desirable that the scoop be tilted quickly rearwardly on the arms so that its open side is directed upwardly to prevent spillage of material therefrom. Furthermore, during the continued upward movement of the arms 14, it is desirable to keep the scoop 20 with its open side directed upwardly. To control the scoop 20 in its tilting movement on the forward ends of the boom arms 14, I provide a novel linkage arrangement.

This linkage arrangement, as shown in Figures 1 and 2, comprises a rockable lever 35 pivoted to the forward section 17 of each of the arms 14. The lever 35 is pivoted to the arm 14 by means of a pivot structure 36 which is located somewhat below the upper or inner end of the section 17, assuming that the arm 14 is in its lowermost position. It will be noted that the lever 35 has a relatively long arm 37 above the pivot 36 and a relatively short arm 38 below the pivot and that the upper arm 37 is curved rearwardly. The upper arm 37 is pivoted at its upper end by a pivot structure 39 to the rear or upper end of a rigid link 40. The forward or lower end of this link 40 is pivoted by a pivot structure 41 to a lug or bracket 42 upstanding from the top wall of the scoop 20. The lower arms of levers 35 are pivoted to the lower ends of the extensible links 43. Each of these extensible links consists of a lower rod section 44 which is provided with a clevis 45 that is pivoted by pin 46 to the lower arm 38 of the associated lever. The rod section 44 is coupled by coupling 47 to the lower end of the piston rod 48 which is a part of the ram 49. The cylinder 50 of the ram is provided with a transverse pivot sleeve 51 on its upper end which is pivoted to the frame of the tractor at the point 52 shown in Figure 1. It will be noted that this pivot point 52 is level with the pivot point 19 for the boom arm 14.

Suitable valve controls (not shown) will also be provided for the rams 49 so that they can both be controlled simultaneously. The rams 49 are also preferably hydraulically operated and when fluid is supplied thereto, the links 43 will be extended since piston rods 48 will be moved downwardly which will swing the lower arms 38 of the levers 35 forwardly and their upper arms 37 rearwardly thereby tilting the scoop 20 upwardly on the boom arms 14. When the fluid pressure is exhausted from the cylinders 50, the scoop 20 can drop downwardly. The rams 49 will be manually controlled to initially position the scoop 20 as shown in Figure 1, for scooping up material and will be manually controlled to tilt the scoop 20 forwardly for dumping when the arms 14 are in their uppermost position as shown by the broken lines in Figure 1.

It will be noted from Figure 1 that in the linkage arrangement the pivot points 39 are rearwardly of the pivot points 46 which are in substantial vertical alignment with the pivot points 36. Also, it will be noted that extensible links 43 extend downwardly from pivot points 52, where they are pivoted to the tractor frame, across the sections 16 of boom arms 14, to the lower ends of levers 35 to which they are pivoted at pivot points 46. Therefore, as the arms 14 are swung upwardly by rams 25, with the rams 49 held rigid, the scoop 20 will be tilted rearwardly and upwardly quickly so that its open side will be directed upwardly and there will be no further spillage of material therefrom. This is due to the fact that as arms 14 swing upwardly, the links 43 will push on the lower arms of levers 35 thereby swinging their upper arms rearwardly and exerting a rearward pull on the rigid links 40. As the arms 14 swing above the level of pivots 19, the links 40 will swing the scoop 20 forwardly. Thus, during its entire upward movement, the scoop 20 will be kept with its open side facing upwardly.

With this linkage arrangement, the position of the scoop 20 relative to the boom arms 14 will be automatically controlled during the vertical swinging movement of the boom arms. However, the scoop 20 may be positively tilted by controlling the rams 49, both of which will be controlled simultaneously, to extend or retract the links 43.

Figure 3:
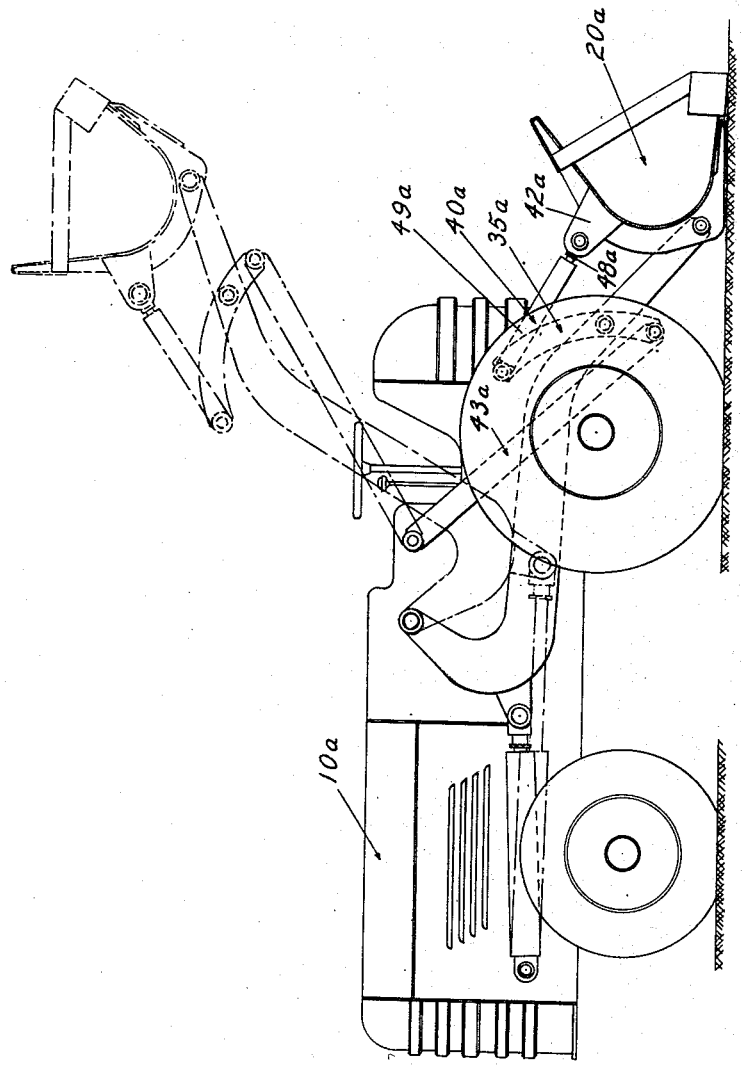
Figure 3 is a view similar to Figure 1 but showing a modification of the linkage.
Figure 4:
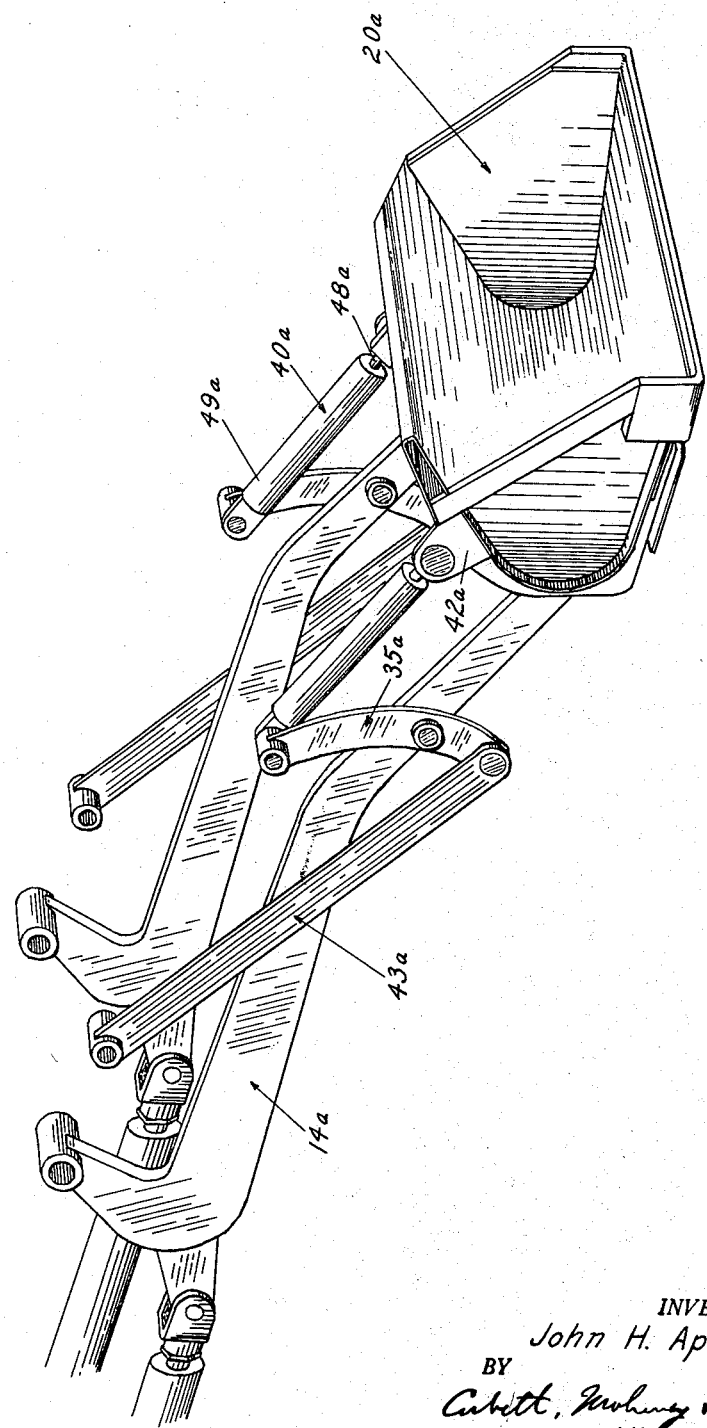
Figure 4 is a perspective view similar to Figure 2 but showing the modified linkage.

In Figures 3 and 4, I have illustrated a portable loader which is constructed identical with that shown in Figures 1 and 2 except that the linkage arrangement is modified. In this instance, the links 43a between the tractor 10a and the lower ends of the levers 35a are the rigid non-extensible links. The links 40a between the upper ends of the levers 35a and the brackets 42a on the scoop 20a are the extensible links. The piston rod 48a of each ram is pivoted to the bracket 42a and the cylinder 49a of each ram is pivoted to the upper arm of the associated lever 35a. When fluid is supplied to the rams of the links 40a, the scoop 20a will be tilted forwardly and when it is exhausted therefrom the scoop can be tilted rearwardly. The linkage will function automatically for controlling the position of the scoop 20a during vertical movement of the boom arms 14a in exactly the same manner as with the arrangement shown in Figures 1 and 2.

It will be apparent from the above description that I have provided a portable loader having novel linkage means to automatically control the position of the scoop as the boom swings vertically, the linkage means also including means for positively controlling the position of the scoop relative to the boom to facilitate digging or dumping.

Having thus described my invention, what I claim is:

A loader comprising a tractor, a boom arm pivoted at each side of the tractor for vertical swinging movement, a scoop pivoted to the outer ends of the boom arms for vertical tilting movement relative thereto and having an open forward side, each boom arm being provided with an upstanding rear section and a forwardly and downwardly extending section, the upstanding rear section being pivoted at its upper end to the adjacent side of the tractor at a point rearwardly and upwardly thereof and the forwardly and downwardly extending section extending forwardly and downwardly of the front end of the tractor when the boom arm is in its lowermost position, the scoop being pivoted to the outer ends of the forwardly and downwardly extending sections of the two boom arms, means for raising and lowering the boom arms and comprising a fluid-actuated ram connected to each arm and said tractor, said ram having its rear end pivoted to the side of the tractor and its forward end pivoted to the associated boom arm at the rear side thereof at the junction between said upstanding rear section and said forwardly and downwardly extending section, and linkage means for automatically tilting said scoop relative to said boom arms as the boom arms swing it upwardly from its lowermost position where it is disposed with its open forward side directed forwardly, said linkage means comprising a set of links carried by each of said boom arms, each set of links comprising a lever pivoted to the boom arm intermediate the ends of the forwardly and downwardly extending section of the arm and so that the upper part of the lever is longer than the lower part thereof, an upper link pivotally connected to the upper end of the lever and pivotally connected directly to the scoop, and a lower link pivotally connected to the lower end of the lever and pivotally connected to the tractor at a point spaced forwardly of the pivotal connection of the associated boom arm thereto, said lever and said links being of such lengths that when the boom arm is in its lowermost position and the scoop is directed forwardly, the pivots between the scoop and the upper link and between the upper link and the upper end of the lever are disposed above the boom arm and the said pivot between the upper link and the upper end of the lever is spaced rearwardly from the pivot between the lower link and the lower end of the lever so that as the boom arm is raised from its lower position with the scoop in digging position and with its open forward side directed forwardly, the scoop is tilted inwardly with its open side upright and is maintained in substantially such position until the boom arm is raised sufficiently for dumping, the pivotal connection of the lower link with the tractor being above the level of the said forwardly and downwardly extending section of the associated boom arm when the arm is in its lowermost position and being at substantially the same level as the pivotal connection of the rear upstanding section of the boom arm and the tractor, and a fluid-actuated ram in one of the links of each of the sets of links for positively tilting said scoop relative to the boom arms.

References Cited in the file of this patent

UNITED STATES PATENTS

| | | |
|---|---|---|
| 2,412,323 | Conrad | Dec. 10, 1946 |
| 2,463,675 | Beyerstedt | Mar. 8, 1949 |
| 2,482,612 | Drott et al. | Sept. 20, 1949 |
| 2,537,010 | Andersen | Jan. 9, 1951 |
| 2,628,731 | Reuter | Feb. 17, 1953 |
| 2,645,369 | Allan | July 14, 1953 |